United States Patent [19]

Ehrich

[11] 4,104,002

[45] Aug. 1, 1978

[54] SPIRAL STRIP ACOUSTIC TREATMENT

[75] Inventor: Frederic Franklin Ehrich, Marblehead, Mass.

[73] Assignee: General Electric Company, Lynn, Mass.

[21] Appl. No.: 746,975

[22] Filed: Dec. 2, 1976

[51] Int. Cl.² ............................................. F04D 29/66
[52] U.S. Cl. .................................. 415/119; 137/15.1; 181/222
[58] Field of Search .............. 415/119; 137/15.1, 15.2; 181/33 HA, 33 H, 42, 50

[56] References Cited

U.S. PATENT DOCUMENTS

| 2,805,730 | 9/1957 | Applegate | 181/42 |
| 3,508,838 | 4/1970 | Martenson | 181/33 HA |
| 3,542,152 | 11/1970 | Adamson et al. | 415/119 |
| 3,692,141 | 9/1972 | Labussiere | 181/33 H |
| 3,830,335 | 8/1974 | Zorumski | 181/33 H |
| 3,890,060 | 6/1975 | Lipstein | 181/33 HA |
| 3,937,590 | 2/1976 | Mani | 181/33 HA |
| 3,947,148 | 3/1976 | Holt | 415/119 |

Primary Examiner—C. J. Husar
Attorney, Agent, or Firm—Henry J. Policinski; Derek P. Lawrence

[57] ABSTRACT

An acoustic duct such as a jet engine fan duct is lined with a plurality of circumferentially spaced strips of sound-absorbing materials which extend helically about the duct axis and which are effective to scatter spinning mode acoustic pressure fields to higher order attenuating modes for improved noise suppression. To maximize noise reduction, the pitch angle of the helix may be aligned to the direction of the wave front generated by the first stage rotor blades of a fan or compressor disposed in the duct when operating at a supersonic velocity relative to the incoming airstream. Alternate strips may be tuned to different frequencies and/or be separated by untreated strips.

7 Claims, 5 Drawing Figures

U.S. Patent  Aug. 1, 1978  4,104,002
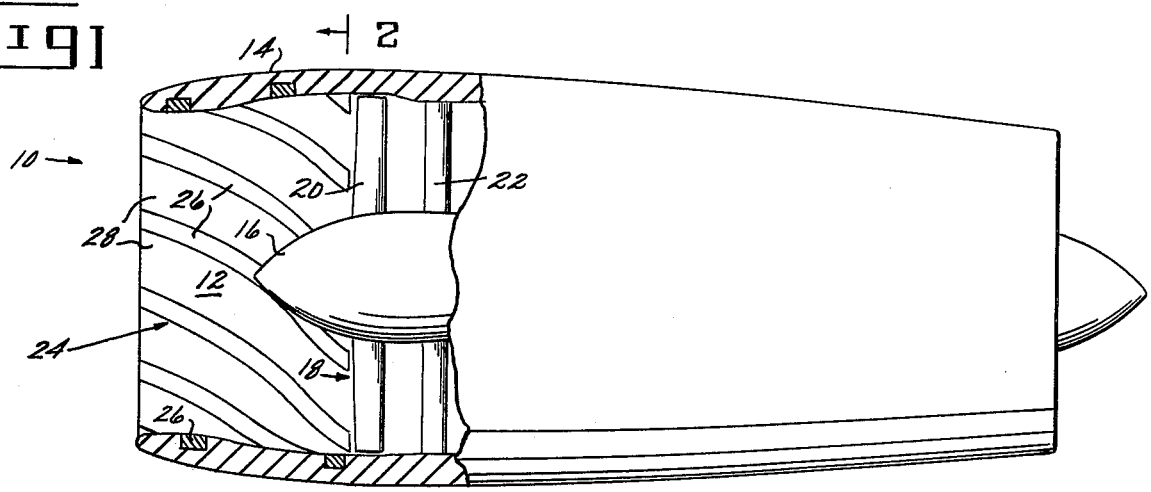
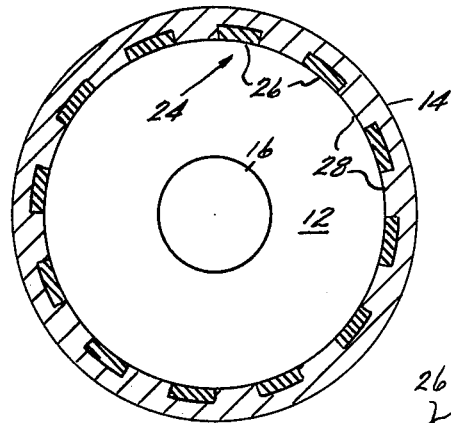
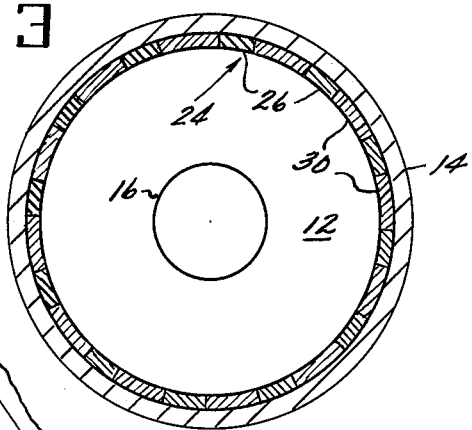
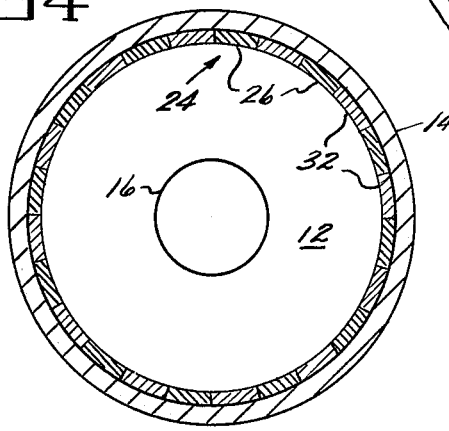
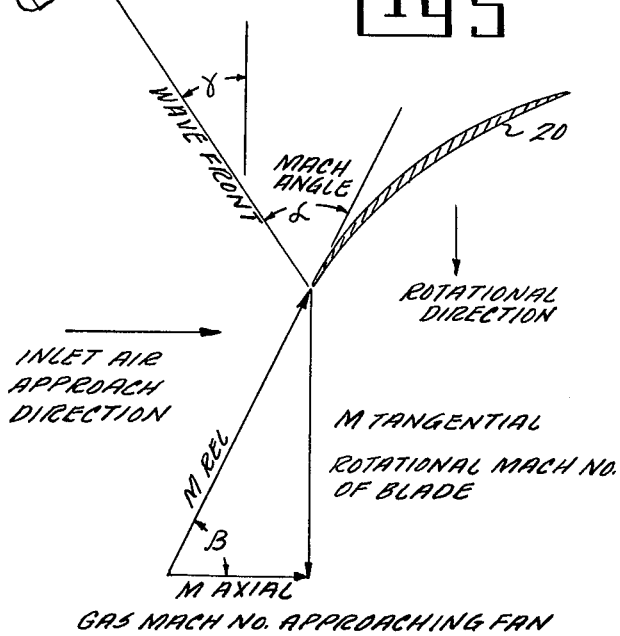

SPIRAL STRIP ACOUSTIC TREATMENT

BACKGROUND OF THE INVENTION

This invention relates to sound-absorbing acoustic ducts, and more particularly to acoustic ducts lined with material for absorbing spinning mode acoustical energy. As a typical application, the invention relates to noise suppressing linings for the inlet of an aircraft jet engine fan and/or compressor.

The sound pressure field generated by an axial flow compressor or fan operating with supersonic gas velocity relative to the rotor blade contains rotating pressure patterns or spinning modes caused primarily by shocks emanating from the leading edge of the rotor blades. It is these spinning modes that are transmitted through the duct and radiate objectionable noise to the outside.

It has been proposed to reduce such noise by lining the interior surface of the duct with acoustically absorbent material. One such lining which is tailored to suppress spinning mode sound is disclosed in U.S. application Ser. No. 503,031 filed by R. Mani on Sept. 3, 1974, now U.S. Pat. No. 3,937,590 and assigned to the assignee of this invention. The Mani application discloses that segmented acoustical treatment is effective to enhance scattering of spinning mode acoustic pressure fields to increase the higher order, attenuating type mode content for improved sound suppression in an acoustic duct of any cross section. As is known the duct has a cut-off property depending upon the tip speed of the rotating pressure patterns. Higher order mode number or lobe number pressure patterns have a tip speed less than the speed of sound and are attenuated, while lower order mode number pressure patterns have a tip speed greater than the speed of sound and are propagated. Assuming a cylindrical duct, the effect of attaching interrupted sections of strips of sound-absorbing material to the inner duct surface is to alter the modal distribution and provide an additional periodicity to which the sound field must conform. The acoustical energy is scattered to increase the ratio of higher order, attenuating modes. The number of equally spaced strips in the set is usually large, in any event several or more, and for the case where the noise source is a compressor with the rotor and stator blades, the number of strips exceeds or is a multiple of the number of first stage rotor blades. The lining disclosed in the Mani application comprises a plurality of peripherally spaced longitudinally extending strips of material which are effective to scatter spinning mode acoustic pressure fields to higher order attenuating modes. It has also been proposed to use such acoustically absorbent strips in a circumferentially extending manner. Such prior art structures have exhibited good noise reduction characteristics but there remains room for improvement, particularly under the ever more stringent noise requirements for newly certificated aircraft being set by Government regulatory agencies.

OBJECT OF THE INVENTION

It is therefore the primary object of the present invention to provide an acoustic treated duct for suppression of spinning mode sound which exhibits improved noise suppression characteristics.

SUMMARY OF THE INVENTION

This and other objects of this invention have been achieved in the preferred embodiments of the invention wherein spinning mode noise emanating from a duct is significantly reduced. It has been found that reduction of spinning mode noise in a duct may be significantly improved over prior art treatments by lining the interior of the duct with a plurality of circumferentially spaced helically extending strips of sound-absorbing material which are effective to scatter spinning mode acoustic pressure fields to higher order attenuating modes. Noise suppression is maximized by aligning the angle of the helix to the direction of the wave front generated by the first stage of a rotor disposed in the duct when operating at a supersonic velocity relative to the incoming airstream. The helical path of the strips permits them to be aligned parallel the acoustical wave generated by the rotor to increase their scattering effect on the acoustical energy and thereby significantly improve noise suppression.

In one embodiment alternate strips have different widths so as to be tuned to different frequencies. In an alternate embodiment acoustically treated strips are alternated with untreated strips.

BRIEF DESCRIPTION OF THE DRAWINGS

FIG. 1 is a diagrammatic side elevational view, partially in longitudinal cross section, of the forward portion of a ducted fan type aircraft jet engine having a fan duct provided with acoustical treatment according to the teachings of this invention;

FIG. 2 is a vertical cross section of only the inlet fan duct taken on the line 2—2 of FIG. 1;

FIG. 3 is similar to FIG. 2 and shows an alternate embodiment using alternating axially extending strips of two different acoustic materials;

FIG. 4 is similar to FIG. 2 and shows an alternate embodiment using alternating acoustically treated and untreated strips;

FIG. 5 is a diagram illustrating the relationship between the angle at which the helically extending acoustic strips are disposed on the fan duct of this invention and the geometry of the fan duct and rotor.

DESCRIPTION OF THE PREFERRED EMBODIMENTS

This invention has general utility to acoustic ducts used for the suppression of noise and sound produced by compressors, fans, and other rotating mechanical equipment which generates acoustic pressure fields characterized by spinning mode patterns. The application discussed in detail is a more effective acoustic treatment or noise suppressing lining for the inlet duct of an aircraft jet engine fan to reduce the noise level heard at the ground especially during take-off and landing. In FIG. 1 there is shown generally at 10 the forward portion of ducted fan type turbojet engine having an annular streamlined fan duct air passage 12 formed between an annular cowling or fan casing 14 of streamlined cross section and a suitable engine nacelle structure 16 projecting within the cowling 14. The cowling 14 houses a suitable compressor, combustor, and turbomachinery (not shown) for, as part of its functions, driving an axial flow fan shown generally at 18 disposed in the air passage 12 between the forward end of the cowling 14 and the engine compressor (not shown). The fan 18 is illustrated as being comprised by a single rotor member 20 and stator member 22, but additional stages can be provided as is known in the art. The fan drives inlet air axially through the primary air passage 12 to provide propulsive thrust to the engine as well as to supply air to the fan 18.

Referring also to FIG. 2, the inside surface of the cowling 14 at least in the inlet duct area forward of the rotor 20 in accordance with the invention is lined with an acoustical treatment shown generally at 24. In one embodiment the acoustical treatment 24 comprises a set of at least several circumferentially spaced strips 26 of a suitable sound-absorbing material, these strips being relatively thin and extending helically about the longitudinal axis of the duct 14. Preferably a large number of the circumfernetially spaced, helically extending strips 26 are provided, recessed into the duct wall so as to be flush with the smooth metal lining 28 between the strips. For rotors wherein the rotor blade tip speed is sonic, the number of strips is desirably two or three times the number of rotor blades, while for rotors with a subsonic tip speed the number of strips is suitably about one and one-half times the number of rotor blades. Although the helical strip acoustical treatment is illustrated as extending forward of the rotor 20, where more effective noise reduction is needed, the full length of the fan duct may also be lined with the helical strip acoustical treatment of this invention or alternatively other types of acoustical treatment may be used aft of the rotor 20.

An alternate embodiment of the invention shown in FIG. 3 utilizes a second set of helically wound sound-absorbing strips 30 that are located between an alternate with the strips 26. The acoustical materials of which the two sets of strips 26 and 30 are made have different acoustical properties or acoustical impedances at the frequency or range of frequencies of interest. Preferably, the strips 26 and 30 have the same thickness, but different widths, but this is not essential. In the general case, a wide variety of acoustic materials can be used, but for the specific application of an aircraft engine fan jet the material should be easily cleaned and provide for drainage of ingested liquids, such as a single degree of freedom treatment or the honeycombed, resonant chamber sound-absorbing panels described in U.S. Pat. No. 3,540,682, assigned to the same assignee as this invention. When resonant chamber type acoustical treatment is used, the two materials for strips 26 and 30 can be tuned to resonate at different frequencies.

Referring to FIG. 4 therein is shown an alternate embodiment of the invention in which a second set of helically wound strips 32 that are located between and alternate with the strips 26 are provided. The strips 32 are not acoustically absorbent and are preferably constructed of a light weight metal of the type generally used in aircraft engine duct construction. The embodiment of FIG. 4 while less effective than the embodiment of FIG. 3 in reducing noise offers the advantage of being more economically constructed.

The effect of the helically extending strip acoustical treatment is to provide a large number of interruptions in the acoustical treatment as the spinning mode acoustic pressure fields sweep past the duct wall. There is an additional periodicity to which the sound field must conform, and a resulting enhanced scattering or multiple reflection of the sound fields to spinning modes of high, non-propagating lobe number. As compared to a fully-treated fan duct, the helical strip acoustical treatment is effective to alter the modal distribution of acoustic energy and increase the ratio or content of attenuating mode sound to propagating mode sound and thereby provide improved noise suppression as more fully described in the aforementioned Mani application.

As indicated in the Mani application, the acoustical wave generated by the duct rotor propagates through the duct in a spiral or helical path. By aligning the acoustical strips with the path taken by the wave, noise reduction may be maximized. Thus, the angle at which the helically extending strips are disposed on the duct wall may be selected to optimize noise attenuation. Referring to FIG. 5, therein is shown a diagram illustrating the relationship between the optimum angle at which the helically extending strip are disposed and the geometry of the fan duct and rotor to maximize noise attenuation. As can be seen from this diagram the optimum angle $\gamma$ is determined by the formula:

$$\gamma = \alpha + \beta - 90°$$

where:
$\alpha = \sin^{-1}(1/M_{rel})$
$M_{rel} = (M^2_{axial} + M^2_{tangential})^{1/2}$
$M_{axial}$ = Approach Mach number of incoming air
$M_{tangential}$ = Rotational Mach number of blade
$\beta = \tan^{-1}(M_{tangential}/M_{axial})$ It will be understood that although an acoustic duct with a circular cross section has been used in explaining the principles of the invention, that the invention in its broader aspect is applicable to acoustic ducts with a rectangular, square, or other cross section. Further, acoustic ducts for the reduction and absorption of spinning mode acoustic pressure fields as herein taught have many other applications than those specifically given.

While the invention has been particularly shown and described with reference to several preferred embodiments thereof, it will be understood by those skilled in the art that the foregoing and other changes in form and details may be made therein without departing from the spirit and scope of the invention. Thus it is also possible to apply the acoustic treatment disclosed herein in one area of a duct (such as the inlet) and use other forms of acoustic treatment, such as that disclosed in the Mani application in other areas of the duct.

What is claimed is:
1. An acoustic duct for transmitting and absorbing acoustic pressure fields characterized by spinning modes comprising
  a longitudinally extending rigid duct having attached to the inner surface thereof a set of at least several circumferentially spaced, strips of sound-absorbing material which extend helically about the longitudinal axis of the duct,
  said set of peripherally spaced strips being effective to achieve scattering of the spinning mode acoustic pressure fields for improved sound suppression.
2. An acoustic duct according to claim 1 further including a second set of at least several circumferentially spaced, helically extending strips of sound-absorbing material attached to the inner surface of said duct located between and alternating with said first-mentioned set of strips.
3. An acoustic duct according to claim 2 wherein said first-mentioned and second set of strips are made of sound-absorbing materials having different acoustical impedances.
4. An acoustic duct according to claim 2 wherein said second set of strips are made of a light-weight non-sound absorbing material.

5. An acoustic duct according to claim 1 wherein said strips are helically disposed at an angle calculated to optimize sound attenuation.

6. An acoustic duct according to claim 5 wherein said angle is substantially equal to the angle at which the acoustic pressure field propagates in said duct.

7. An acoustic duct according to claim 6 further comprising:
a compressor with first stage rotor and stator blades disposed in said duct which interact with an incoming airstream to produce spinning mode acoustic pressure waves which propagate in a helical direction through the duct.

* * * * *